US009468348B2

(12) United States Patent
Chen

(10) Patent No.: US 9,468,348 B2
(45) Date of Patent: Oct. 18, 2016

(54) CYCLONE VACUUM CLEANER AND CYCLONE SEPARATION DEVICE THEREOF

(71) Applicant: X'POLE PRECISION TOOLS INC., Zhongli, Taoyuan County (TW)

(72) Inventor: Bach Pangho Chen, Claremont, CA (US)

(73) Assignee: X'POLE PRECISION TOOLS INC., Zhongli, Taoyuan County (TW)

( * ) Notice: Subject to any disclaimer, the term of this patent is extended or adjusted under 35 U.S.C. 154(b) by 3 days.

(21) Appl. No.: 14/219,535

(22) Filed: Mar. 19, 2014

(65) Prior Publication Data
US 2015/0265112 A1    Sep. 24, 2015

(51) Int. Cl.
*B01D 45/12* (2006.01)
*A47L 9/16* (2006.01)

(52) U.S. Cl.
CPC .............. *A47L 9/1608* (2013.01); *A47L 9/165* (2013.01); *A47L 9/1666* (2013.01); *A47L 9/1683* (2013.01); *A47L 9/1691* (2013.01); *B01D 45/12* (2013.01)

(58) Field of Classification Search
CPC . A47L 9/1666; A47L 9/1608; A47L 9/1683; A47L 9/165; A47L 9/1691; A47L 5/32
USPC ......... 55/459.1, 428, 429, 424, 426, DIG. 3; 15/353
See application file for complete search history.

(56) References Cited

U.S. PATENT DOCUMENTS

| 6,440,197 | B1 * | 8/2002 | Conrad et al. | 95/271 |
|---|---|---|---|---|
| 2005/0138763 | A1 * | 6/2005 | Tanner et al. | 15/353 |
| 2008/0047091 | A1 * | 2/2008 | Nguyen | 15/300.1 |
| 2009/0265883 | A1 * | 10/2009 | Reed et al. | 15/353 |
| 2010/0139033 | A1 * | 6/2010 | Makarov et al. | 15/353 |

* cited by examiner

*Primary Examiner* — Dung H Bui
(74) *Attorney, Agent, or Firm* — Muncy, Geissler, Olds & Lowe, P.C.

(57) ABSTRACT

A cyclone separation device includes a cyclone chamber and an airflow guiding member. The cyclone chamber includes an air inlet, an annular sidewall forming an air receiving region therein communicating with the air inlet and guiding an airflow to flow spirally in the air receiving region, and a dust collecting region and an air outlet disposed at two ends of the cyclone chamber along an axis of the cyclone chamber. The dust collecting region communicates with the air receiving region. The airflow guiding member is disposed at the dust collecting region, and includes an airflow guiding chamber, at least one airflow entry opening communicating with the dust collecting region and airflow guiding chamber, and an airflow discharge opening communicating with the airflow guiding chamber and disposed on the axis of the cyclone chamber to face the air outlet and output the airflow to form an air discharging region.

6 Claims, 5 Drawing Sheets

CYCLONE VACUUM CLEANER AND CYCLONE SEPARATION DEVICE THEREOF

FIELD OF THE INVENTION

The present invention relates to a cyclone separation device, and particularly to a cyclone separation device that includes an airflow guiding member provided in a cyclone chamber, and a cyclone vacuum cleaner including the same.

BACKGROUND OF THE INVENTION

Cyclone separation is a kind of centrifugal sedimentation. Due to a centrifugal force, particulates in a vortex airflow are rotated at a high speed. As the rotational speed gets higher, the speed of centrifugal sedimentation of the particulates also becomes higher, such that the particulates can be separated from the airflow. Referring to FIG. 1, a conventional cyclone separator mainly includes a separation barrel 8. The separation barrel 8 is provided with an air inlet 81 on its wall surface, and has a lower portion whose diameter is gradually reduced and a top portion provided with an air suction channel 82. When in use, air containing particulates enters from the air inlet 81, and forms a descending vortex flow along the inner wall of the separation barrel 8. Then, a suction force is applied to the air suction channel 82 to form an ascending airflow in the separation barrel 8. Due to the weight of the particulates, the particulates cannot ascend with the ascending airflow and are deposited at the bottom of the separation barrel 8, thereby producing a dust collecting effect.

The dust filtering effect of the above conventional cyclone vacuum cleaner may be inadequate under certain circumstances. To reinforce the dust filtering effect of the cyclone separator, two approaches are proposed in the prior art. In the first approach, the volume of the chamber in the separation barrel is increased. In the second approach, a multi-layer dust filtering inner barrel is provided in the separation barrel, as disclosed in the Taiwan Patent No. I411422, Taiwan Publication No. 201340929, and China Publication No. CN103181741. However, the increased volume of the chamber inside the separation barrel inevitably expands the overall volume of the cyclone separator. On the other hand, the provision of the multi-layer dust filtering inner barrel also complicates the structure of the cyclone separator, meaning that not only maintenance is difficult but also periodical replacement of the dust filtering inner barrel may become another potential major issue. In the recent years, the cyclone separation technology is successfully applied to household vacuum cleaners. As household vacuum cleaners are required to collect only a small amount of dust or particulates, the above small-sized cyclone separator having a simple structure is sufficient. However, for industrial applications that demand dust filtering effects in industrial scales, the above conventional cyclone separator may fail to meet the corresponding industrial needs.

SUMMARY OF THE INVENTION

Therefore, the primary object of the present invention is to provide a cyclone separation device having a preferred dust filtering effect and a simpler structure.

To achieve the above object, a cyclone separation device for a cyclone vacuum cleaner is provided. The cyclone separation device includes a cyclone chamber and an airflow guiding member. The cyclone chamber includes an air inlet, an annular sidewall, a dust collecting region and an air outlet. The air inlet allows an airflow to enter the cyclone chamber. The annular sidewall forms an air receiving region therein communicating with the air inlet, and guides the airflow to flow spirally in the air receiving region. The dust collecting region and the air outlet are disposed at two ends of the cyclone chamber along a same axis of the cyclone chamber. The dust collecting region communicates with the air receiving region. The airflow guiding member, provided at the dust collecting region, includes an airflow guiding chamber, at least one airflow entry opening and an airflow discharge opening. The at least one airflow guiding opening communicates with the dust collecting region and the airflow guiding chamber, and allows the airflow in the dust collecting region to enter the airflow guiding chamber. The airflow discharge opening communicates with the airflow guiding chamber, and is disposed on the axis of the cyclone chamber to face the air outlet and output the airflow from the airflow guiding chamber to form an air discharging region.

In one embodiment, the airflow guiding member includes an airflow rebounding surface. The airflow rebounding surface encircles the airflow discharge opening and faces the air outlet, and is an arched surface recessed toward the dust collecting region.

In one embodiment, the airflow guiding member includes a choke slanting surface extended from the air rebounding surface toward the air receiving region.

In one embodiment, the airflow guiding member includes a dust limiting surface facing the dust collecting region.

In one embodiment, the airflow guiding member includes a support section connected to the cyclone chamber, and a connecting section connected to the support section and extended toward the air outlet. The airflow entry opening is disposed at the connecting section.

In one embodiment, the air outlet and the airflow discharge opening of the airflow guiding member are disposed coaxially.

In one embodiment, the cyclone chamber includes a dust outlet communicating with the dust collecting region.

In one embodiment, the cyclone chamber includes an air discharging duct forming the air outlet and extending toward the dust collecting region. The air discharging duct has a length exceeding the position of the air inlet.

It is another object of the present invention to provide a cyclone vacuum cleaner. The cyclone vacuum cleaner includes a cyclone separation device, a vacuum tube, a vacuum motor, and a dust collecting barrel. The cyclone separation device includes a cyclone chamber and an airflow guiding member disposed in the cyclone chamber. The cyclone chamber includes an air inlet, an annular sidewall, an air outlet and a dust collecting region. The air inlet allows an airflow to enter the cyclone chamber. The annular sidewall forms an air receiving region therein communicating with the air inlet, and guides the airflow to flow spirally in the air receiving region. The dust collecting region and the air outlet are disposed at two ends of the cyclone chamber along a same axis of the cyclone chamber. The dust collecting region communicates with the air receiving region. The airflow guiding member, provided at the dust collecting region, includes an airflow guiding chamber, at least one airflow entry opening and an airflow discharge opening. The at least one airflow entry opening communicates with the dust collecting region and the airflow guiding chamber, and allows the airflow in the dust collecting region to enter the airflow guiding chamber. The airflow discharge opening communicates with the airflow guiding chamber, and is disposed on the axis of the cyclone chamber to face the air outlet and output the airflow from the airflow guiding chamber to form an air discharging region. The vacuum tube is connected to the air inlet. The vacuum motor is connected to the air outlet, and generates a suction force after being powered on. The suction force changes a pressure in the cyclone chamber, such that the airflow passes from the air receiving region to the air discharging region via the dust collecting region to flow toward the vacuum motor. The dust collecting barrel is disposed correspondingly to the dust collecting region of the cyclone chamber.

In one embodiment, the airflow guiding member includes an airflow rebounding surface. The airflow rebounding surface encircles the airflow discharge opening and faces the air outlet, and is an arched surface recessed toward the dust collecting region.

In one embodiment, the airflow guiding member includes a choke slanting surface extended from the air rebounding surface toward the air receiving region.

In one embodiment, the airflow guiding member includes a dust limiting surface facing the dust collecting region.

In one embodiment, the airflow guiding member includes a support section connected to the cyclone chamber, and a connecting section connected to the support section and extended toward the air outlet. The airflow entry opening is disposed at the connecting section.

In one embodiment, the air outlet and the airflow discharge opening of the airflow guiding member are disposed coaxially.

In one embodiment, the cyclone chamber includes a dust outlet communicates with the dust collecting region.

In one embodiment, the cyclone chamber includes an air discharging duct forming the air outlet and extending toward the dust collecting region. The air discharging duct has a length exceeding the position of the air inlet.

Compared to the prior art, the above structure provides the features below. First of all, the overall structure of the cyclone separation device is simple, and favors an installation procedure. Secondly, with the airflow guiding member provided in the cyclone separation device, the airflow in the cyclone separation device is able to more effectively flow into every region to generate more effective dust filtering effects.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
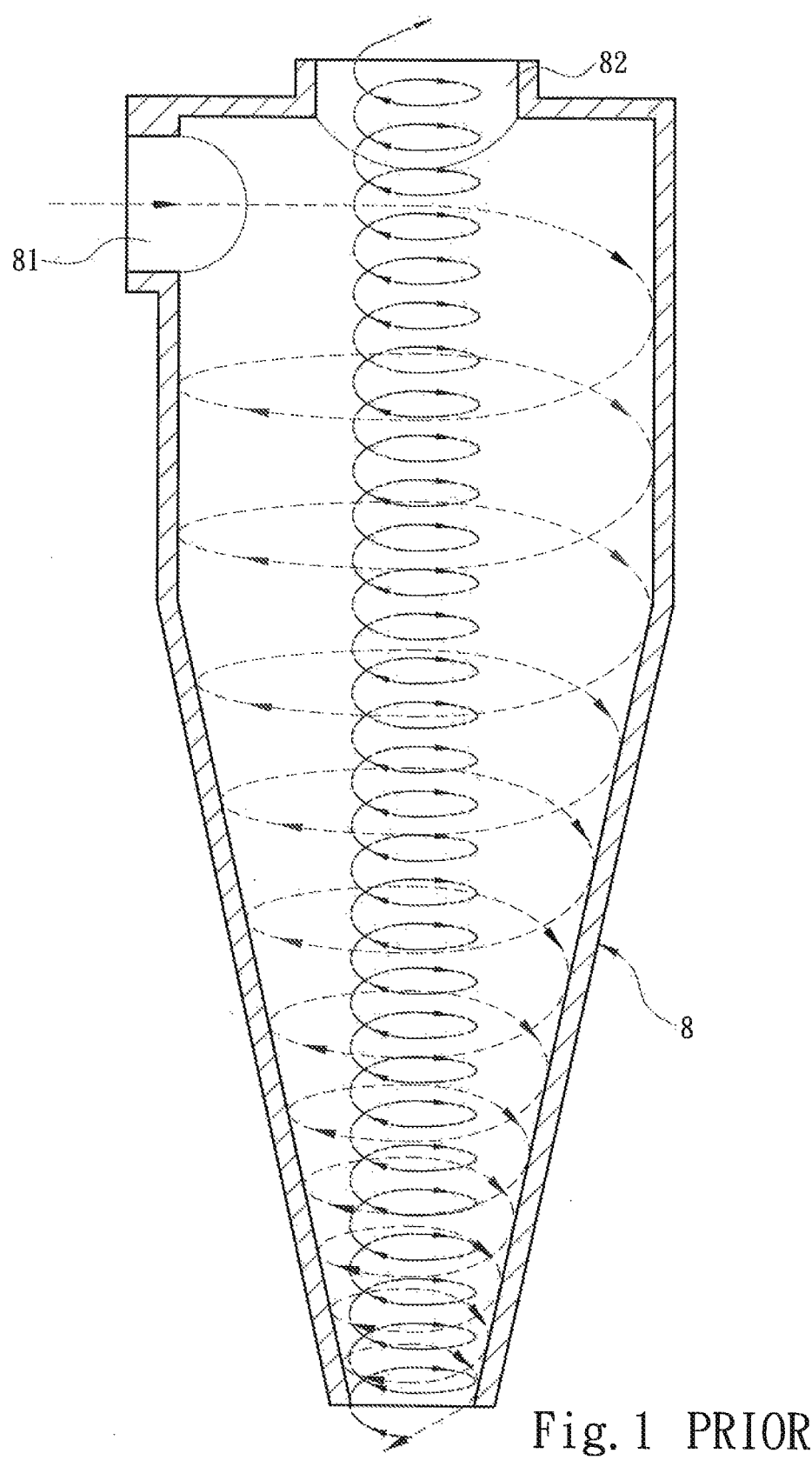
FIG. 1 is a schematic diagram of a conventional cyclone separation device.
Figure 2:
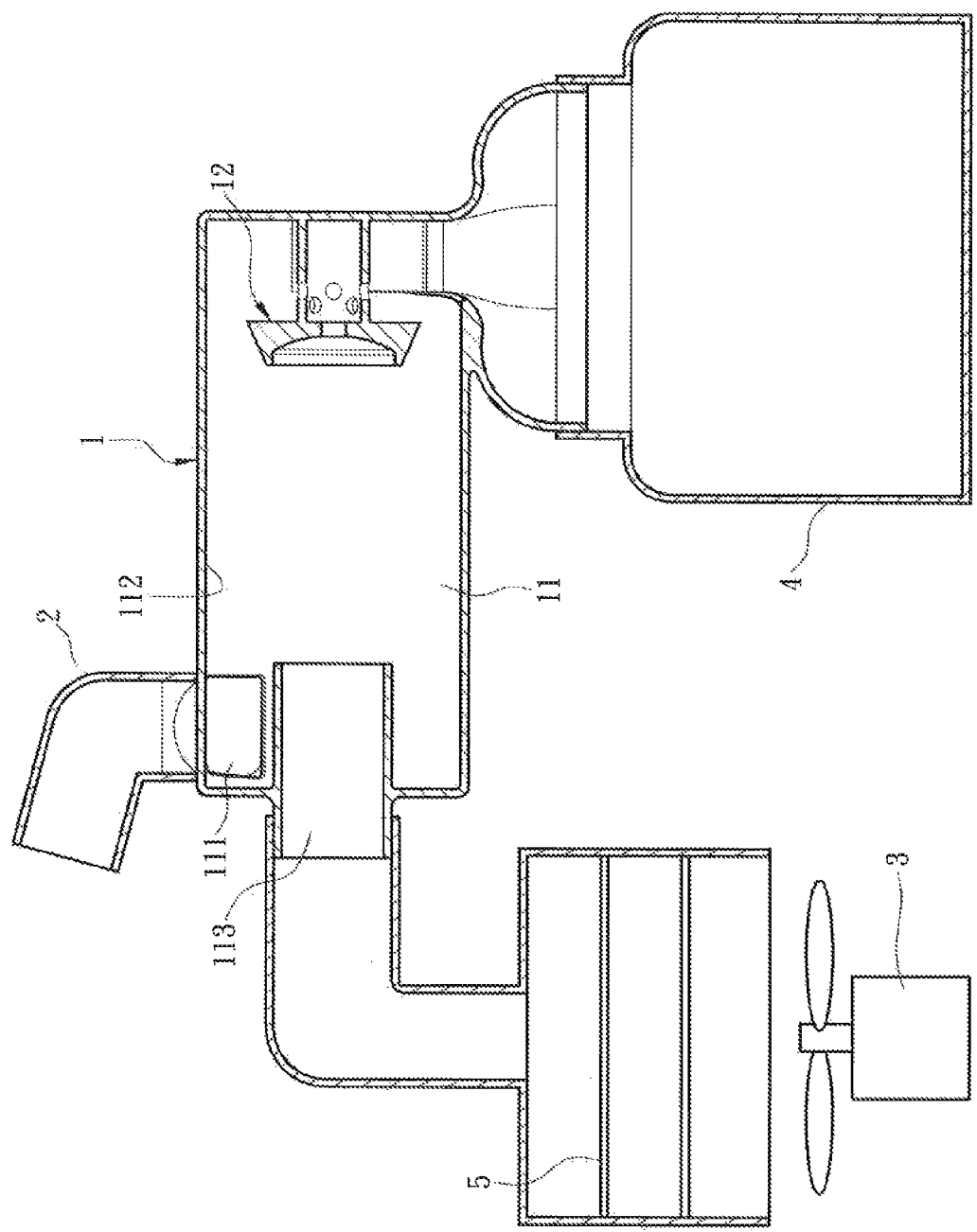
FIG. 2 is a schematic diagram of a structure of a cyclone vacuum cleaner according to an embodiment of the present invention.
Figure 3:
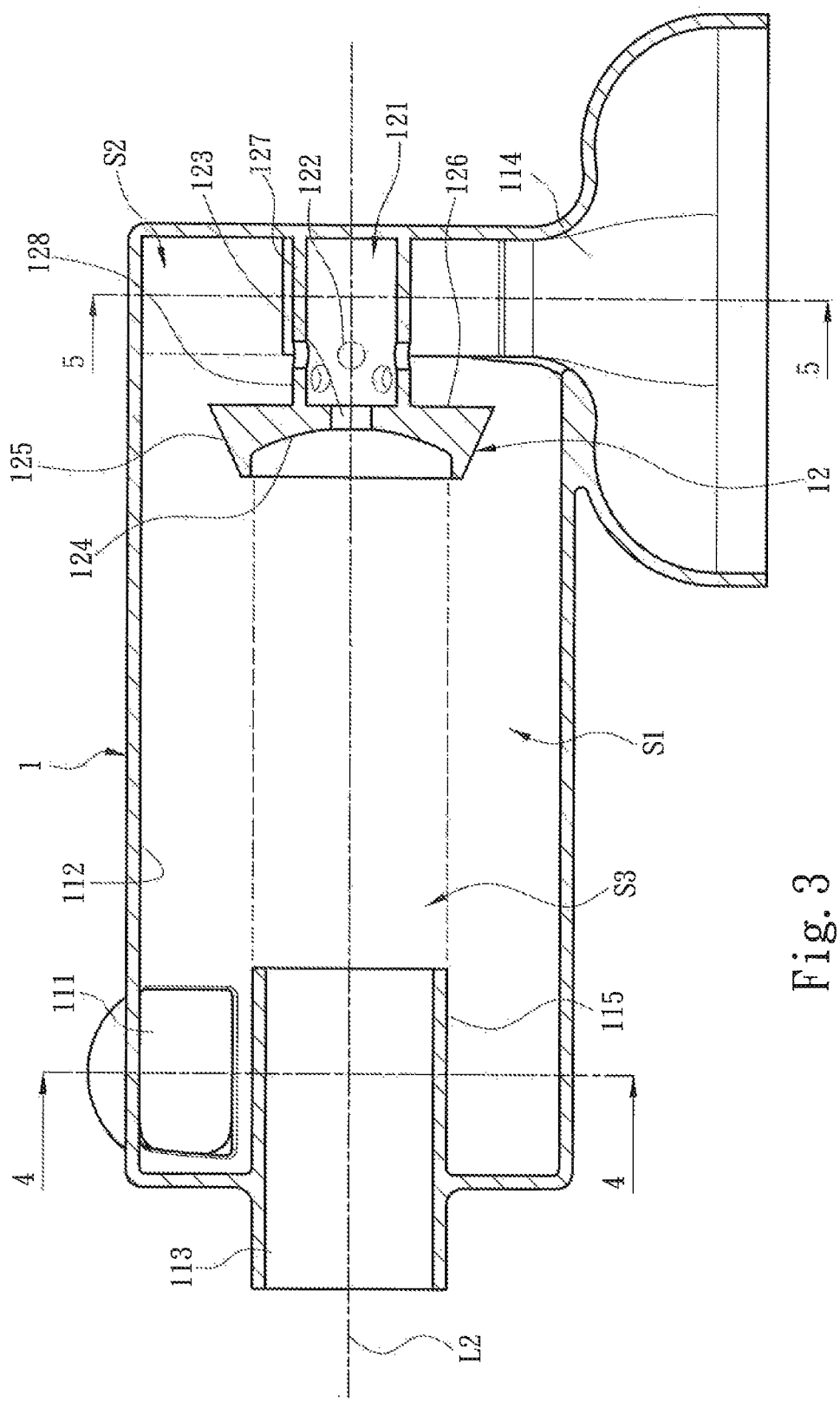
FIG. 3 is a sectional view of a structure of a cyclone separation device according to an embodiment of the present invention.
Figure 5:
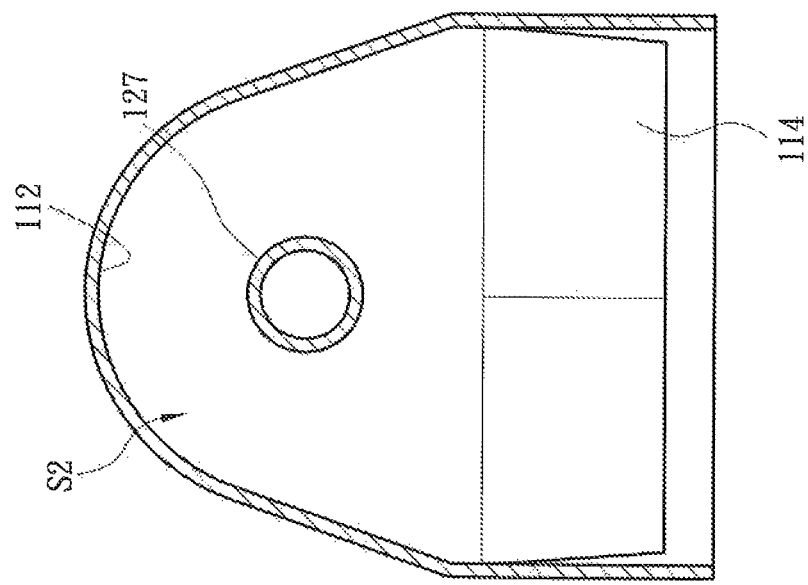
FIG. 5 is a sectional view along a section line B-B in FIG. 2.
Figure 4:
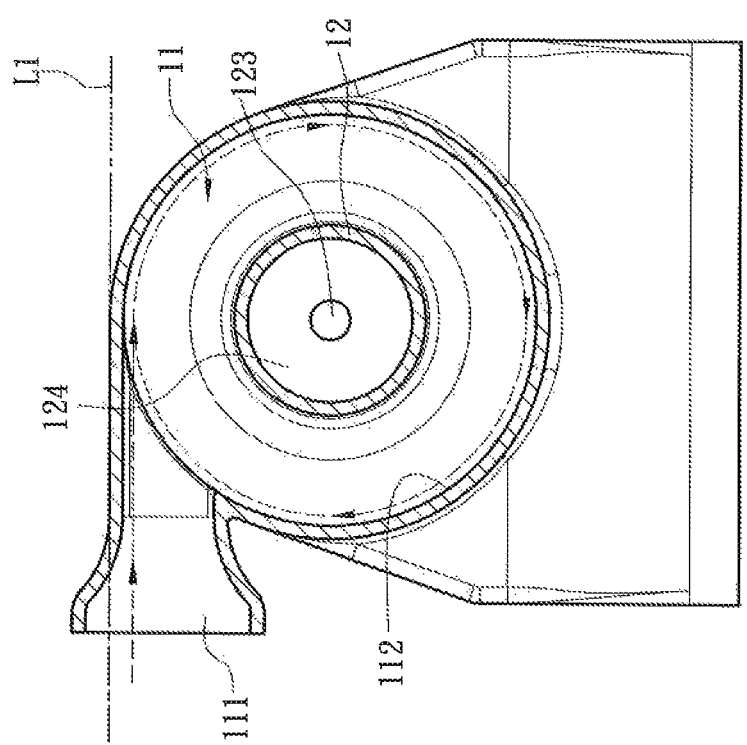
FIG. 4 is a sectional view along a section line A-A in FIG. 2.
Figure 6:
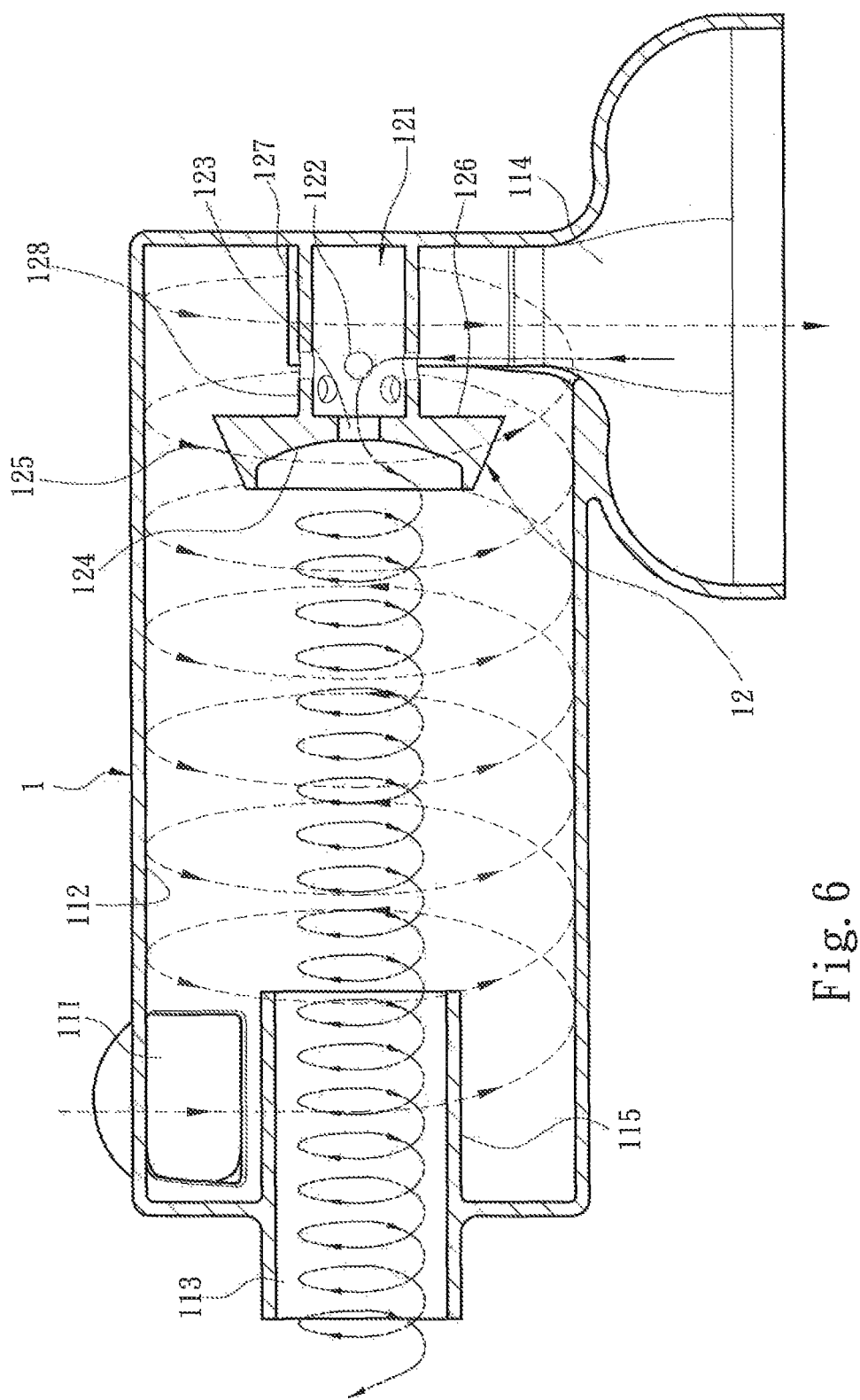
FIG. 6 is a schematic diagram of an airflow in a cyclone separation device according to an embodiment of the present invention.

The present invention provides a cyclone vacuum cleaner and a cyclone separation device thereof, which are applicable for industrial purposes. Referring to FIG. 2 to FIG. 5, the cyclone vacuum cleaner is formed by a cyclone separation device 1, a vacuum tube 2, a vacuum motor 3, and a dust collecting barrel 4. The cyclone separation device 1 includes a cyclone chamber 11, and an airflow guiding member 12 disposed in the cyclone chamber 11. The cyclone chamber 11 is in fact a space formed inside the cyclone separation device 1, and has an air inlet 111, an annular sidewall 112, and an air outlet 113. The air inlet 111 may be disposed along a tangent L1 of the annular sidewall 112, and allows an airflow to enter the cyclone chamber 11. The annular sidewall 112 is in fact an inner wall of the cyclone chamber 11. With the annular inner wall, the airflow entering the cyclone chamber 11 via the air inlet 111 is guided to flow spirally. Thus, in the present invention, a region where the airflow flows spirally in the cyclone chamber 11 is defined as an air receiving region S11. The cyclone chamber 11 further includes a dust collecting region S2 and an air outlet 113 that are disposed at two ends of the cyclone chamber 11. Further, the dust collecting region S2 and the air outlet 113 are correspondingly disposed on an axis L2 of the cyclone chamber 11. In addition, the dust collecting region S2 is in communication with the air receiving region S11, meaning that the airflow may communicate between the dust collecting region S2 and the air receiving region S11. The airflow guiding member 12 is located at the dust collecting region S2, and includes an airflow guiding chamber 121, at least one airflow entry opening 122, and an airflow discharge opening 123. In practice, the airflow guiding member 12 of the present invention is disposed correspondingly to the air outlet 113 along the axis L2. That is to say, the airflow guiding member 12 and the air outlet 113 are disposed coaxially. In the present invention, the airflow guiding chamber 121 is also a space formed in the airflow guiding member 12 that is hollow in structure. The airflow entry opening 122 communicates with the dust collecting region S2 and the airflow guiding chamber 121, and allows the airflow in the dust collecting region S2 to enter the airflow guiding chamber 121 via the airflow entry opening 122. The airflow discharge opening 123 communicates with the airflow guiding chamber 121, and is disposed on the axis L2 to face the air outlet 113 and output the airflow from the airflow guiding chamber 121 to form an air discharging region S3 in the cyclone chamber 11. The vacuum tube 2, connected to the air inlet 111, may be a flexible tubal structure such as a hose. The vacuum motor 3, connected to the air outlet 113, generates a suction force after being powered on. The suction force changes a pressure in the cyclone chamber 11, such that the airflow from the air receiving region S1 passes through the dust collecting region S2 and the air discharging region S3 to flow toward the vacuum motor 3. The dust collecting barrel 4 is disposed correspondingly to the dust collecting region S2 of the cyclone chamber 11. Further, the cyclone chamber 11 is provided with a dust outlet 114 which is shaped correspondingly to the dust collecting barrel 4. For example, the dust outlet 114 is funnel-shaped as shown in the diagrams. It should be noted that, the example in the diagrams is for illustration purpose and is not to be construed as a limitation to the present invention. Further, at least one filter 5 may be disposed between the vacuum motor 3 and the cyclone separation device 1, so as to filter out tiny dust from the airflow 5. The cyclone chamber 11 is further provided with an air discharging duct 115 which forms the air outlet 113 and extends toward the dust collecting region S2. The air discharging duct 115 has a length exceeding beyond the position of the air inlet 111.

Again referring to FIG. 3 to FIG. 5, when the cyclone vacuum cleaner is activated to perform dust collecting, the vacuum motor 3 generates a suction force and the pressure in the cyclone chamber 11 is accordingly changed via the air outlet 113, such that the airflow in the cyclone chamber 11 is discharged via the air outlet 113 to flow toward the vacuum motor 3. Meanwhile, the pressure in the cyclone chamber 11 changes to prompt the vacuum tube 2 to suck external air in to form the airflow. The airflow passes through the air inlet 111 to enter the cyclone chamber 11, and spirally flows toward the dust collecting region S2 along the annular sidewall 112 in the air receiving region S1. As such, due to the centrifugal force generated by the spiral airflow, a part of the dust having a greater mass in the airflow is thrown toward the dust collecting region S2 and collected in the cyclone chamber 11. The airflow then passes through the dust collecting region S2 and enters the dust collecting barrel 4. Rebounded by the inner wall of the dust collecting barrel 4 and sucked by the vacuum motor 3, the airflow in the dust collecting barrel 4 flows towards the airflow guiding member 12. However, the dust with a greater mass in the airflow cannot be rebounded and is collected in the dust collecting barrel 4. Further, the airflow flowing toward the airflow guiding member 12 passes through the airflow entry opening 122 and enters the airflow guiding chamber 121 in the airflow guiding member 12. Due to the aperture design of the airflow entry opening 122, the airflow before entering the airflow guiding member 12 is compressed and accelerated, and then is further concentrated by the airflow guiding chamber 121 to be discharged from the airflow discharge opening 123 toward the air discharging region S3. With the airflow guiding member 12, the airflow flowing in the air discharging region S3 spirally flows again, which causes the dust in the airflow to be thrown toward the air receiving region S1 due to the centrifugal force. That is to say, in the present invention, the airflow in the air discharging region S3 again undergoes a spiral flow to filter out the dust from the airflow, and thus a clean airflow is discharged via the air outlet 113 to the vacuum motor 3. When implementing the cyclone vacuum cleaner of the present invention, the cyclone separation device 1 may be placed horizontally, as shown in FIG. 1. Such arrangement further reduces the height of the cyclone vacuum cleaner to favor installation in the factory.

In one embodiment of the present invention, the airflow guiding member 12 of the cyclone separation device 1 further includes an airflow rebounding surface 124. The airflow rebounding surface 124, encircling the airflow discharge opening 123 and facing the air outlet 113, further limits a flow direction of the airflow in the air discharging region S3. Further, the airflow rebounding surface 124 may be an arched surface recessed toward the dust collecting region S2. Moreover, the airflow guiding member 12 may further include a choke slanting surface 125 extended from the air rebounding surface 124 toward the air receiving region S11, and a dust limiting surface 126 facing the dust collecting region S2. The choke slanting surface 125 is slanted from an edge of the air rebounding surface 124 toward the air discharging region S3. That is to say, the provision of the choke slanting surface 125 shields a part of the air receiving region S1, and a slope of the choke slanting surface 125 may be a negative value, thereby rebounding and guiding the airflow near the air discharging region S3 back into the air receiving region S11. Further, the provision of the dust limiting surface 126 limits the dust collected in the dust collecting region S2, so as to prevent the airflow from ascending again to mix with the dust when the airflow enters the dust collecting region S2 to reduce the dust filtering effect of the cyclone separation device 1. The airflow guiding member 12 of the present invention may further include a support section 127 connected to the cyclone chamber 11, and a connecting section 128 connected to the support section 127 and extended toward the air outlet 113. Further, the airflow entry opening 122 is disposed at the connecting section 128 to prevent the dust from entering the airflow guiding chamber 121 via the airflow entry opening 122.

In conclusion, a cyclone vacuum cleaner and a cyclone separation device thereof are provided by the present invention. The cyclone separation device includes a cyclone chamber and an airflow guiding member disposed in the cyclone chamber. The cyclone chamber includes an air inlet, an annular sidewall, an air outlet, and a dust collecting region. The annular sidewall forms an air receiving region therein communicating with the air inlet, and guides the airflow to flow spirally in the air receiving region. The dust collecting region and the air outlet are disposed at two ends of the cyclone chamber along a same axis of the cyclone chamber. The dust collecting region communicates with the air receiving region. The airflow guiding member, provided at the dust collecting region, includes an airflow guiding chamber, at least one airflow entry opening and an airflow discharge opening. The at least one airflow entry opening communicates with the dust collecting region and the airflow guiding chamber, and allows the airflow in the dust collecting region to enter the airflow guiding chamber. The airflow discharge opening communicates with the airflow guiding chamber, and is disposed on the axis of the cyclone chamber to face the air outlet and output the airflow from the airflow guiding chamber to form an air discharging region. Thus, with the above cyclone vacuum cleaner and cyclone separation device thereof offering a preferred dust filtering effect and a simpler structure, inconveniences of conventional approaches are overcome.

What is claimed is:

1. A cyclone separation device of a cyclone vacuum cleaner, comprising:
    a cyclone chamber, comprising:
        an air inlet, allowing an airflow to enter the cyclone chamber;
        an annular sidewall, forming an air receiving region therein communicating with the air inlet, and guiding the airflow to flow spirally in the air receiving region;
        a dust collecting region disposed at one end of the sidewall and communicated with the air receiving region;
        an air outlet disposed at other end opposite to the dust collecting region and along the same axis with the dust collecting region to discharge the airflow; and
    an airflow guiding member, located within the dust collecting region and disposed to a projection position of the air outlet, comprising:
        an airflow guiding chamber;
        at least one airflow entry opening, communicating with the dust collecting region and the airflow guiding chamber, and allowing the airflow in the dust collecting region to enter the airflow guiding chamber;
        an airflow discharge opening, communicating with the airflow guiding chamber, disposed on the axis of the cyclone chamber to face the air outlet;
        a dust limiting surface facing the dust collecting region;
        a dust outlet communicating with the dust collecting region;

a support section connected to the cyclone chamber, and a connecting section connected to the support section and extended toward the air outlet, and the airflow entry opening is disposed at the connecting section;

an airflow rebounding surface that encircles the airflow discharge opening and faces the air outlet and is an arched surface and is recessed toward the dust collecting region; and a choke slanting surface extended from the airflow rebounding surface toward the air receiving region;

wherein the airflow rebounding surface and the airflow discharge opening defines an air discharging region therebetween, and the air discharging region allows the airflow discharged from the airflow discharge opening discharging from the airflow rebounding surface to the airflow discharge opening.

2. The cyclone separation device of claim 1, wherein the air outlet and the airflow discharge opening of the airflow guiding member are disposed coaxially.

3. The cyclone separation device of claim 1, wherein the cyclone chamber comprises an air discharging duct forming the air outlet and extending toward the dust collecting region, the air discharging duct has a length exceeding the position of the air inlet.

4. A cyclone vacuum cleaner, comprising:
a cyclone separation device, comprising:
a cyclone chamber, comprising:
an air inlet, allowing an airflow to enter the cyclone chamber;
an annular sidewall, forming an air receiving region therein communicating with the air inlet, and guiding the airflow to flow spirally in the air receiving region; and
a dust collecting region disposed at one end of the sidewall and communicated with the air receiving region;
an air outlet disposed at other end opposite to the dust collecting region and the same axis with the dust collecting region to discharge the airflow; and
an airflow guiding member, located within the dust collecting region in the cyclone chamber and disposed to a projection position of the air outlet, comprising:
an airflow guiding chamber;
at least one airflow entry opening, communicating with the dust collecting region and the airflow guiding chamber, and allowing the airflow in the dust collecting region to enter the airflow guiding chamber;
an airflow discharge opening, communicating with the airflow guiding chamber, disposed on the axis of the cyclone chamber to face the air outlet;
a dust limiting surface facing the dust collecting region;
a dust outlet communicating with the dust collecting region;
a support section connected to the cyclone chamber, and a connecting section connected to the support section and extended toward the air outlet; the airflow entry opening is disposed at the connecting section;
an airflow rebounding surface that encircles the airflow discharge opening and faces the air outlet, and the airflow rebounding surface is an arched surface and is recessed toward the dust collecting region;
a choke slanting surface extended from the airflow rebounding surface toward the air receiving region;
a choke slanting surface extended from the airflow rebounding surface toward the air receiving region, wherein the airflow rebounding surface and the airflow discharge opening defines an air discharging region therebetween, and the air discharging region allows the airflow discharged from the airflow discharge opening discharging from the airflow rebounding surface to the airflow discharge opening;
a vacuum tube, connected to the air inlet;
a vacuum motor, connected to the air outlet, generating a suction force after being powered on; the suction force changing a pressure in the cyclone chamber, such that the airflow passes from the air receiving region to the air discharging region via the dust collecting region to flow toward the vacuum motor; and
a dust collecting barrel, disposed correspondingly to the dust collecting region of the cyclone chamber.

5. The cyclone vacuum cleaner according to claim 4, wherein the air outlet and the airflow discharge opening of the airflow guiding member are disposed coaxially.

6. The cyclone vacuum cleaner according to claim 4, wherein the cyclone chamber comprises an air discharging duct forming the air outlet and extending toward the dust collecting region, the air discharging duct has a length exceeding the position of the air inlet.

* * * * *